United States Patent [19]
Sumser et al.

[11] Patent Number: 5,758,500
[45] Date of Patent: Jun. 2, 1998

[54] EXHAUST GAS TURBOCHANGER FOR AN INTERNAL COMBUSTION ENGINE

[75] Inventors: Siegfried Sumser, Stuttgart; Horst Hanauer, Althütte, both of Germany

[73] Assignee: Mercedes-Benz AG, Stuttgart, Germany

[21] Appl. No.: 839,351

[22] Filed: Apr. 17, 1997

[30] Foreign Application Priority Data

Apr. 18, 1996 [DE] Germany ............... 196 15 237.2

[51] Int. Cl.⁶ ................................................. F02B 37/12
[52] U.S. Cl. ................................ 60/602; 415/158
[58] Field of Search ............................. 60/602; 415/158

[56] References Cited

U.S. PATENT DOCUMENTS

| | | | |
|---|---|---|---|
| 4,653,275 | 3/1987 | Sumser et al. | 60/602 |
| 4,776,168 | 10/1988 | Woollenweber | 60/602 |
| 4,886,416 | 12/1989 | Wunderlich | 60/602 |
| 4,894,990 | 1/1990 | Tsubouchi | 60/602 |
| 5,025,629 | 6/1991 | Woolenweber | |
| 5,441,383 | 8/1995 | Dale et al. | 415/158 |
| 5,454,225 | 10/1995 | Sumser et al. | |

FOREIGN PATENT DOCUMENTS

| | | |
|---|---|---|
| 0 051 125 | 5/1982 | European Pat. Off. . |
| 0 678 657 | 5/1989 | European Pat. Off. . |
| 126 796 | 8/1977 | German Dem. Rep. . |
| 28 43 202 | 4/1980 | Germany . |
| 34 27 715 | 12/1985 | Germany . |
| 34 41 115 | 1/1986 | Germany . |
| 38 33 906 | 5/1989 | Germany . |
| 42 32 400 | 8/1993 | Germany . |
| 43 03 521 | 1/1994 | Germany . |
| 43 30 487 | 1/1995 | Germany . |

*Primary Examiner*—Michael Koczo
*Attorney, Agent, or Firm*—Klaus J. Bach

[57] ABSTRACT

In an exhaust gas turbocharger for an internal combustion engine comprising a compressor and a turbine with an impeller and a turbine wheel mounted on a common shaft, the exhaust turbine includes radial and semi-axial flow passages through which the exhaust gas is conducted to the turbine wheel and which are separated by a guide ring, and an annular sleeve is mounted in the turbine housing so as to be slideable therein along the axis of the turbine wheel across the radial flow passage for closing the radial flow passage of the turbine.

7 Claims, 1 Drawing Sheet

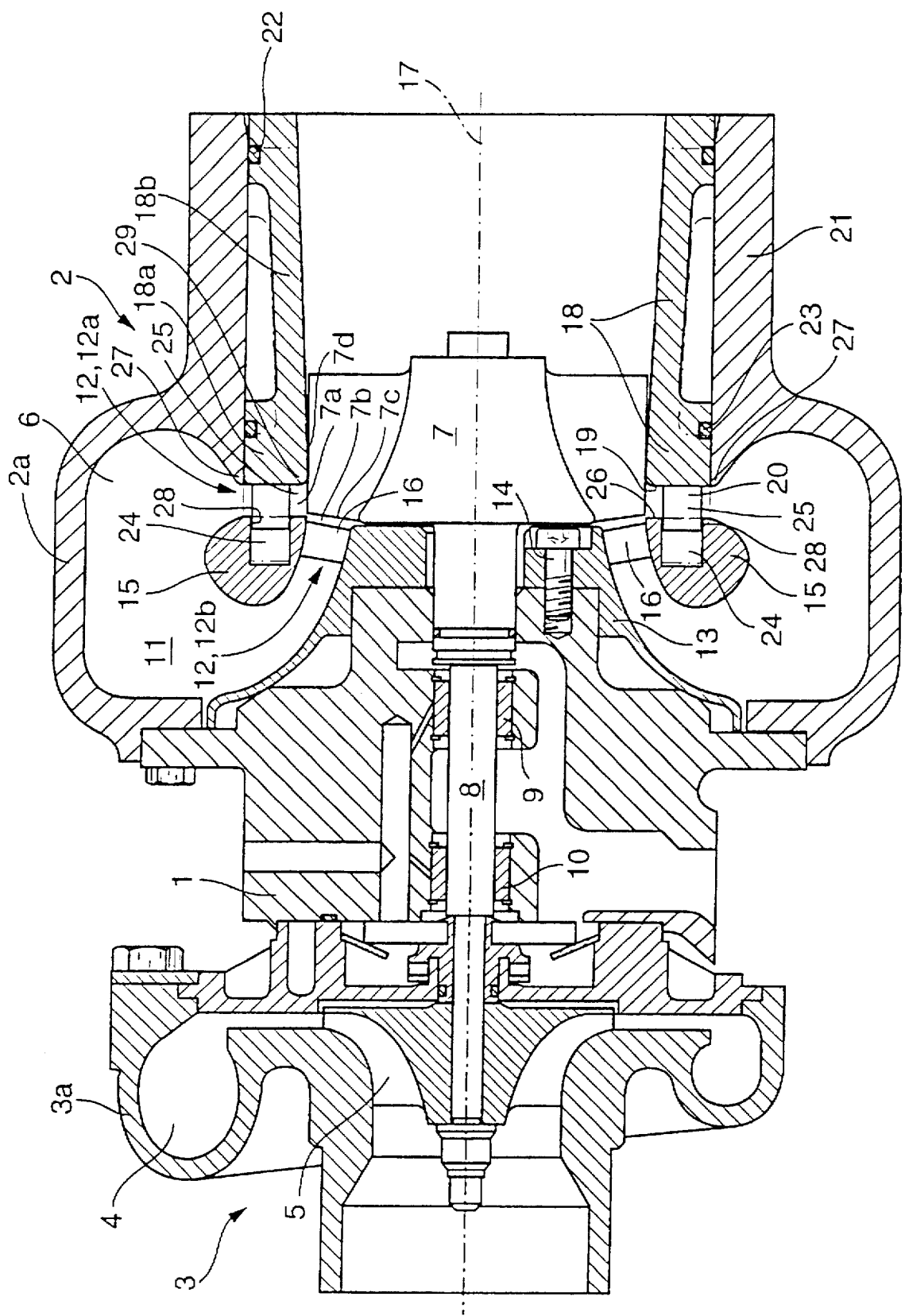

EXHAUST GAS TURBOCHANGER FOR AN INTERNAL COMBUSTION ENGINE

BACKGROUND OF THE INVENTION

The invention relates to an exhaust gas turbocharger for an internal combustion engine with radial and semi-axial flow passages leading to the turbine wheel from a circumferential flow channel by way of annular nozzle structures including guide vanes with an adjustable flow cross-section.

U.S. Pat. No. 5,454,225 which is assigned to the assignee of the present application discloses an exhaust gas turbocharger for an internal combustion engine. The turbocharger includes a single flow duct with radial and semi-radial flow passages guiding the exhaust gas from a flow duct extending around the turbine rotor onto the rotor. The radial flow passages include controllable guide vanes by which the flow cross-section is adjustable. The annular flow passages are in the form of annular nozzles provided by a ring structure which is mounted on the guide vanes of one of the flow passages.

For general technical background information reference is further made to DE 42 32 400 C1, DOS 38 33 906 A1, DE 34 41 115 C1, DE 34 27 715, DOS 28 43 202 and DD Patent No. 126,796.

It is the object of the present invention to provides a single flow exhaust gas turbine which has a high efficiency also when exhaust gas flow is relatively small.

SUMMARY OF THE INVENTION

In an exhaust gas turbocharger for an internal combustion engine comprising a compressor and a turbine with an impeller and a turbine wheel mounted on a common shaft, the exhaust turbine includes radial and semi-axial flow passages through which the exhaust gas is conducted to the turbine wheel and which are separated by a guide ring, and an annular sleeve is mounted in the turbine housing so as to be slideable therein along the axis of the turbine wheel for closing the radial flow passage of the turbine.

With the arrangement according to the invention part of the flow cross-section can be blocked by the sleeve structure such that, especially with small mass flows, there are relatively little mismatched incident flow losses at the turbine wheel entrance. In addition, it provides for only small flow separation zones whereby the turbine efficiency is substantially improved particularly in that operational range.

Furthermore, the single-flow turbine housing can be relatively large whereby low flow speeds can be maintained in its flow passages and, consequently relatively low flow losses will occur. The gas flow is accelerated within the relatively short length of the guide vane structures whereby advantageous turbine operational efficiencies can be obtained for the various flow guide vane positions. The single flow turbine housing may be of special shape or it may simply be a gas collecting chamber from which the gas under pressure enters the flow guide structure.

Preferably, the annular sleeve is so designed that it can firmly engage the flow guide ring with its front end so that it can fully close the flow cross-section of the turbine inlet passage to the turbine wheel with the exception of some leakage flow. This provides for further improvement of the non-stationary and the consumption behavior of the engine as the flow through one of the annular nozzles can be fully blocked.

The annular sleeve is provided, at its front end preferably with an annular blade structure and the flow guide ring has a recess in which the annular blade structure is received when the annular sleeve is in the turbine inlet closing position.

Preferably, the arrangement is such that the front end of the annular blade structure remains slightly within the recess even when the annular sleeve is fully retracted so as to provide support for the annular blade structure and prevent cogging during axial movement of the annular blade structure into the recess.

When the annular blade structure is fully received in the recess the annular radial inlet nozzle structure is fully closed. This improves engine operation particularly at low mass flows. The whole exhaust gas flow then passes through the partially axial inlet nozzle structure which includes flow guide baffles designed for a smaller mass flow whereby the unstationary and consumption behavior of the engine is improved.

The invention will become more readily apparent from the following description on the basis of the accompanying drawings.

BRIEF DESCRIPTION OF THE DRAWINGS

The sole FIGURE is a cross-sectional view of an exhaust gas turbocharger according to the invention.

DESCRIPTION OF A PREFERRED EMBODIMENT

The turbocharger as shown in the FIGURE comprises a housing 1 with a turbine section 2 and a compressor section 3 arranged in a well known manner.

At one end, a single flow spiral compressor housing 3a with a flow channel 4 is attached to the housing 1 and a radial impeller 5 is disposed in the compressor housing 3a. At the other end, the housing 1 carries a single-flow spiral turbine housing 2a with a gas flow channel 6 disposed around a turbine wheel 7 through which exhaust gas flows in a radial and halfway axial direction and which is part of the turbine section 2. The turbine wheel 7 has a radial flow entrance area 7a and a halfway axial entrance area 7b.

The radial impeller 5 and the turbine wheel 7 are mounted on a common shaft 8 which is supported in the housing 1 by radial bearings 9 and 10.

The single flow spiral flow channel 6 comprises a channel 11 from which the exhaust gas flow is admitted to the turbine wheel 7 by way of an annular nozzle structure 12 with annular nozzles 12a and 12b providing for a radial and a halfway axial flow passage.

The flow channel 6 includes at its end adjacent the housing 1 a cone-shaped border element 13 which is mounted on the housing 1 by bolts 14 and which has a central opening through which the shaft 8 extends.

The annular nozzle structure 12 is divided by a flow guide ring 15 into a radial annular nozzle 12a and a halfway axial annular nozzle 12b. The flow guide ring 15 is supported on a guide blade structure 16 firmly connected to the cone-shaped border element 13 and to the flow guide ring 15. It has an outer shape formed in axial symmetry with respect to the axis 17 of the turbine wheel 7. The guide blade structure 16 is arranged closely adjacent the end face 7c of the turbine wheel 7 and has a narrow flow guide blade cross-section with blades which are optimized for low to medium exhaust gas mass flows.

Between the turbine housing 2a and the peripheral turbine wheel area 7d, there is provided an annular sleeve 18 which is supported in the turbine section 2 so as to be slideable therein in the direction of the turbine wheel axis 17. At its front end 19, the annular sleeve 18 carries a guide blade ring 20 which is mounted thereon for example by friction welding. The annular sleeve 18 comprises a cylindrical section 18a on which the guide blade ring 20 is mounted and which is movable over the turbine wheel 7 with only a small clearance therebetween and has, downstream of the turbine wheel 7, a slightly conical section 18b which forms a diffuser extending from the cylindrical section 18a in downstream direction of the turbine wheel 7. The diameter of the section 18b increases with increasing distance from the turbine wheel 7. Any flow separation occurring at the circumferential edge 29 of the annular sleeve 18 adjacent the turbine wheel periphery 7d is kept very small because of the small diffuser opening 18b of the annular sleeve 18.

The annular sleeve 18 is slideably supported in an exhaust nozzle portion 21 of the turbine housing 2a and is sealed toward the gas flow channel 6 of the turbine 2 by two axially spaced seal rings 22, 23.

The guide blade ring 20 is disposed in the annular radial nozzle 12a and is movable in the direction of the turbine wheel axis 17, and the adjacent flow guide ring 15 has a radially symmetrical outer shape and is provided recess 24 for receiving the guide blade ring 20. With the movable guide blade ring 20 the flow cross-section 25 of the annular radial nozzle 12a can be controlled. The recess 24 in the flow guide ring 15 which receives the guide blade ring 20 is preferably an annular groove extending axially into the flow guide ring 15 and the guide blade ring 20 preferably has an end disc disposed at its free end by which it is supported in the guide ring groove.

If, with a relatively small exhaust gas mass flow, the radial annular nozzle is to be completely closed, so that the radial flow entrance 7a of the turbine wheel 7 is blocked, the annular sleeve 18 is moved inwardly until the front end 19 of the annular sleeve 18 engages a stop 26 of the flow guide ring 15 (this position being shown by a dashed line). In this position of the annular sleeve 18 the guide blade ring 20 is fully received in the recess 24 of the flow guide ring 15 and the radial flow entrance area 7a is closed except for some leakage flow.

When the exhaust gas mass flow increases and the radial flow entrance area 7a is to be opened, for example with full engine load, the annular sleeve 18 is moved axially outwardly into the position as shown in the FIGURE such that the front end 19 of the annular sleeve 18 is in radial alignment with a nose portion 27 of the turbine housing 2a defining the narrowest flow path between the flow guide ring 15 and the turbine housing 2a. In this position of the annular sleeve 18 only the guide blade ring 20 is disposed in the annular nozzle 12a. The guide blade ring 20 and the recess 24 of the flow guide ring 15 are so dimensioned that, in this position of the annular sleeve 18, a portion 28 of the guide blade ring 20 remains within the recess 24 of the flow guide ring 15 in order to prevent jamming of the guide blade ring 20 when it is inserted into the recess 24 in the flow guide ring 15.

Although the recess 24 in the flow guide ring 15 is shown as an annular groove the flow guide ring 15 may have separate axial pockets in which the blades of the flow guide ring are received and which are separated by web portions extending between adjacent pockets.

What is claimed is:

1. An exhaust gas turbocharger for an internal combustion engine, comprising a compressor having an impeller and a turbine having a turbine wheel and being mounted on opposite sides of a turbine housing, said impeller and said turbine wheel being mounted on a common shaft rotatably supported in said turbine housing, said exhaust gas turbine having a housing with radial and semi-axial flow passages having annular nozzles leading to said turbine wheel and being separated by a flow guide ring, an annular sleeve mounted in said turbine housing so as to be slideable therein along the axis of said turbine wheel so as to extend across and block at least one of said flow passages for controlling the exhaust gas flow through said at least one flow passage, a guide blade ring disposed at an end face of said annular sleeve adjacent said flow guide ring such that the guide blades of said guide blade ring are normally disposed in said one flow passage for guiding the exhaust gas onto said turbine wheel, said flow guide ring having an axially extending annular recess structure receiving said guide blade ring when said annular sleeve is in a nozzle closing position.

2. An exhaust gas turbocharger according to claim 1, wherein said annular sleeve is movable axially into firm engagement with said flow guide ring for firmly closing said one flow passage.

3. An exhaust gas turbocharger according to claim 2, wherein said flow passage controllable by said annular sleeve is said radial flow passage.

4. An exhaust gas turbocharger according to claim 1, wherein said guide blade ring is sufficiently wide that its front end remains disposed in said recess even when said annular sleeve is in a flow passage opening position.

5. An exhaust gas turbocharger according to claim 1, wherein said flow guide ring is mounted on the end of a stationary guide blade ring mounted in said semi-axial flow passage.

6. An exhaust gas turbocharger according to claim 1, wherein said flow guide ring has a radial symmetrical outer surface shape.

7. An exhaust gas turbocharger according to claim 1, wherein said annular sleeve extends axially downstream of said turbine wheel and has, downstream of said turbine wheel, a slightly conical inner shape so as to form a diffuser structure.

* * * * *